July 9, 1935. W. D. CANNON ET AL Re. 19,635

BALANCING OCEAN CABLE

Original Filed March 28, 1933

INVENTORS
W. D. CANNON
J. W. MILNOR
BY Eugene G. Brown
ATTORNEY

Reissued July 9, 1935 Re. 19,635

UNITED STATES PATENT OFFICE 19,635

BALANCING OCEAN CABLE

William D. Cannon, Metuchen, and Joseph W. Milnor, Maplewood, N. J., assignors to The Western Union Telegraph Company, New York, N. Y., a corporation of New York Original No. 1,967,183, dated July 17, 1934, Serial No. 663,228, March 28, 1933. Application for reissue March 15, 1935, Serial No. 11,332

10 Claims. (Cl. 178—63)

Figure 1:
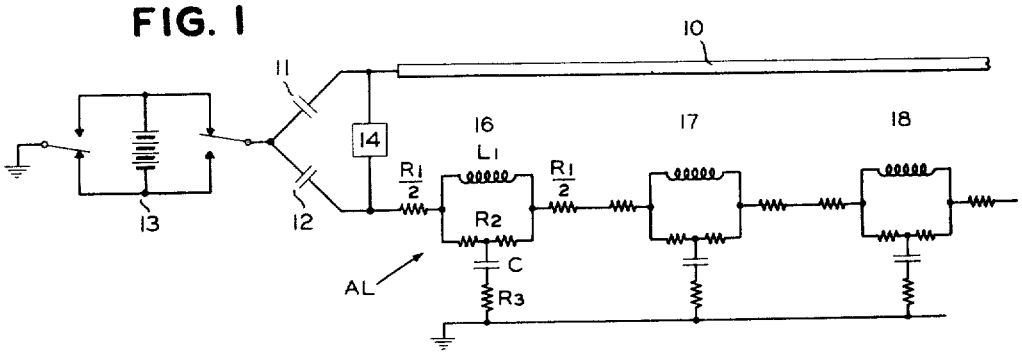

This invention relates to a submarine cable system and to a method of and means for balancing a long submarine telegraph cable by artificial line net works.

It relates particularly to the balancing of a non-loaded submarine cable for duplex operation but is applicable to any type of long cable, either loaded or non-loaded.

In a prior United States Patent No. 1,519,870, granted December 16, 1924, to J. W. Milnor, there is disclosed a simple resistance-capacity artificial line network for balancing non-loaded cables which can be adjusted to accurately simulate the resistance, capacity and inductance of a cable, provided these factors do not vary with frequency. Actually they do vary with frequency in the real cable even at slow signaling speeds and in practice such variations with frequency may be approximately simulated, in the network of the aforesaid patent, by introducing certain irregularities in the network to provide a compromise adjustment. There is, however, a definite limit to the accuracy of the balance which may be obtained with this and similar types of artificial line networks, particularly for the higher frequency components of the telegraph signals.

In a later patent, No. 1,815,629, dated July 21, 1931, there is shown a number of artificial line networks involving the use of inductance coils. These networks were developed to overcome the limitations of the networks of said earlier patent and if properly proportioned they have the characteristics of a smooth line, accurately matching the actual cable both in impedance and propagation constant throughout a wide range of frequency. These networks are somewhat complicated and expensive, however, and the refinements thereof are, in many cases, not required.

In Patent No. 1,941,102, granted December 26, 1933, to J. W. Milnor, entitled "Balancing ocean cables", a still further type of artificial line network is disclosed which, while providing a materially improved duplex balance over the simple resistance-capacity network of Patent No. 1,519,870, does not involve the complicities of the later Patent No. 1,815,629. It comprises briefly a five element network which may consist entirely of capacity and resistance elements or may include simple series inductance.

While the various elements of the network disclosed in the aforesaid application interact to produce the duplex balance, it may be stated in general that the direct current resistance is balanced by a series resistance element in the artificial line, the capacity is compensated by a plurality of shunt capacity elements in combination, and the fixed inductance and the variable resistance and inductance are simulated by the interaction of the series resistance and the plurality of shunt paths, the shunt paths being the more important factor in this simulation. In some cases a fixed inductance may be included in the series path.

The present invention relates to another simple five element artificial line network, the main object of the invention being to produce an improved balance over that obtained with the simple resistance-capacity network with small increase in the complexity and expense of the balancing equipment.

Another object is to produce an artificial line network of simple form which will provide an accurate balance for the impedance of the cable, simulating the variations in the resistance and inductance of the cable with frequency, over the signaling range.

Other objects and advantages of the invention will hereinafter appear.

The current flow in a submarine cable system returns in the armor wires and in the water surrounding the cable. The impedance of a non-loaded submarine cable of approximately uniform structure throughout its length involves principally the direct current resistance and the fixed inductance of the cable, the cable capacity, the alternating current resistance and inductance of the cable which are variable with frequency, and of lesser importance the dielectric absorption. The variation of the resistance and inductance with frequency may be designated the "sea return effect" and is due to the fact that while the very low frequency components of the return current spread out through a relatively wide area of the sea water, the higher frequency components of the current are crowded into a smaller area, current above a certain frequency being practically all confined to the armor wires of the cable as a return path.

The various networks described hereinafter, when elements of the proper value are used therein, accurately simulate the "sea return effects" and other electrical properties of non-loaded cables and with somewhat less accuracy the propagation constant. In the theory subsequently developed, it is assumed that the cable capacity is constant with frequency and that the dielectric losses are negligible. In practice these losses are not entirely negligible but they are small and may be compensated by adding special networks to balance the same, as shown in the aforesaid Patent No. 1,815,629, or they may be balanced by making slight alterations in the values of the elements of the networks. If the cable is of uniform structure throughout its length, that is, if there are no large irregularities at which reflections may take place, the propagation constant may be neglected without serious error.

In accordance with the present invention we employ a five element network consisting of resistance and inductance elements disposed in shunt relation and arranged serially in the artificial line and a resistance and capacity path in shunt to the line. While the various elements to the network do not act entirely independently, in general it may be said that the frequency variable resistance and inductance of the cable is balanced by the parallel resistance and inductance network, the fixed or direct current resistance is balanced by series resistance in the line, the capacity is compensated for by the shunt capacity element and the fixed inductance is balanced by the interaction of the shunt capacity and resistance elements.

Figure 4:
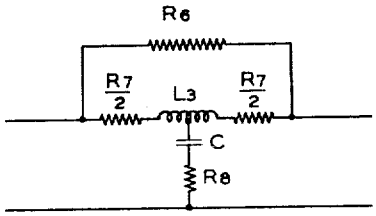
Figure 5:
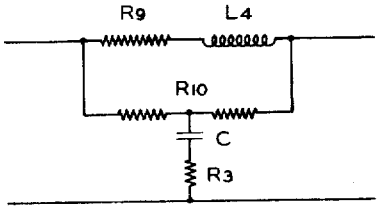
Figure 6:
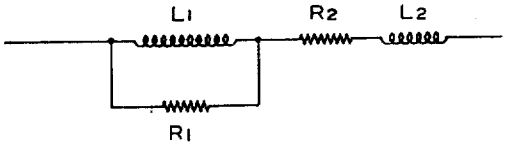

These general properties can be best expressed in their specific relations by means of mathematical formulæ, which will be developed in this specification, in connection with the accompanying drawing, in which:

Figure 1 is a diagrammatic illustration of a cable terminal provided with an artificial line embodying our invention;

Figures 2 to 5 inclusive, illustrate alternate forms of networks for balancing ocean cables, including the sea return effects; and Figure 6 illustrates a basic type of network used heretofore for balancing ocean cables.

Referring first to Figure 1, we have shown a conventional submarine cable 10 terminating in the usual manner for duplex working, the cable being connected to the arms of a Wheatstone bridge provided with condensers 11 and 12. A transmitter 13 is connected between the junction of the bridge arms and ground, and the receiving apparatus 14 is connected across conjugate terminals of the bridge. The artificial line AL provides a balance for the cable so as to prevent transmitted signals from affecting the local receiver.

The artificial line is divided into a number of sections 16, 17, 18, etc., each simulating the electrical properties of a definite length of cable. Each line section includes an inductance element $L_1$ and a resistance element $R_2$ forming a parallel network which is included serially in the artificial line and which serves mainly to balance the variations of the inductance with frequency. The series resistance $R_1$ which compensates for the series resistance of the cable, is divided into two equal parts, designated $$\frac{R_1}{2},$$

to facilitate the adjustment of the elements of the artificial line. The capacity of the cable is provided by the condenser C connected between the midpoint of the resistance $R_2$ and the ground. A resistance $R_3$ in series with the condenser serves, in cooperation therewith, to aid in balancing the fixed inductance of the cable.

The dielectric losses of the cable are not completely balanced by the network shown but may be substantially balanced by adding additional resistance-capacity shunt paths as described in Patent No. 1,815,629, referred to above.

Figure 2:
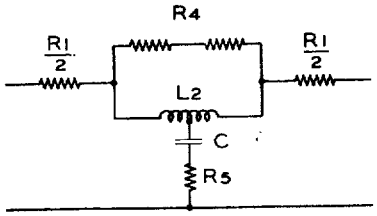

The network of Figure 2 is similar to that of Figure 1 except that the condenser C and resistance $R_5$ are connected from the midpoint of the inductance element $L_2$ instead of the midportion of the resistance.

Figure 3:
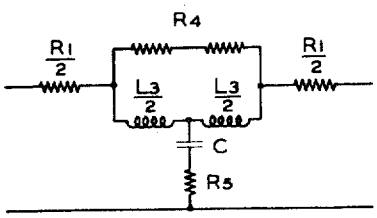

In Fig. 3 the network varies from that of Fig. 2 only in that the two halves of the inductance element $L_3$ are separated.

In Figure 4 a further variation is shown different from that of Figure 2 only in that the shunt resistance $R_6$ bridges the series resistance elements $R_7$ as well as the inductance $L_3$.

In the modification of Figure 5, the series resistance $R_9$ is lumped on one side of the inductance $L_4$ and is bridged by the resistance $R_{10}$, from the central point of which the condenser C and resistance $R_3$, are connected in shunt to the line.

As stated, all of these networks provide a high degree of simulation of the impedance of non-loaded cables including the sea return effect. The propagation constant is simulated less accurately, some of the networks being better in this respect than others. All of these networks have similar characteristics, the advantage of one over the other depending on the particular circumstances of use, cost, ease of adjustment, etc.

For the purpose of illustration, complete calculations for the networks of Fig. 1 are given below to show mathematically the close simulation of the real cable properties with these general types of networks, and to give the equations for obtaining the values of the elements of the networks in terms of measured properties of the cable.

The complete expression for the characteristic or surge impedance of a non-loaded cable, including the sea return impedance, is a highly complicated function of the frequency. In practice, however, it has been found that this impedance can be represented with sufficient accuracy for most cables by an empirical expression which may be derived as follows:

The well known general equation for the surge impedance of a cable is $$Z=\sqrt{\frac{R+j\omega L}{G+j\omega C}}$$

in which the expression $$R+j\omega L$$

represents the linear resistance and reactance of the copper conductor and sea return path, and the expression $$G+j\omega C$$

represents the leakage and capacity reactance of the insulating material, where

R=resistance
L=inductance
G=leakage
C=capacity
$\omega=2\pi$ times the frequency
$j=\sqrt{-1}$ As previously stated both R and L vary somewhat with frequency.

In Figure 6 we have shown an artificial line network copied from our prior Patent No. 1,815,629, the impedance of which, using the symbols shown on the drawing is:

$$Z'=\frac{j\omega L_1R_1}{R_1+j\omega L_1}+R_2+j\omega L_2 \qquad (1)$$

This network was shown in said patent to closely approximate the $R+j\omega L$ term in the equation for surge impedance. Equation (1) may be rewritten as follows:

$$Z'=R_2\frac{(1+j\omega A-\omega^2B)}{(1+j\omega D)} \qquad (2)$$

where $$A=\frac{L_2+L_1}{R_2}+\frac{L_1}{R_1}$$

$$B=\frac{L_1\times L_2}{R_1\times R_2}$$

$$D=\frac{L_1}{R_1}$$

Substituting the value of Z' in the equation for the surge impedance, the equation becomes, if leakage is omitted, $$Z=\sqrt{R_2\frac{(1+j\omega A-\omega^2 B)}{(1+j\omega D)}\times\frac{1}{j\omega C}} \quad (3)$$

Equation (3) is a close approximation of the impedance characteristic of a submarine cable providing the constants A, B, C, D and $R_2$ are correctly chosen. These values can be computed from the quantities of the network of Fig. 6, which were originally based upon the measured cable parameters. It is obvious that any network, the impedance of which can be expressed in the form of Equation (3) will be substantially equivalent to the cable.

It will now be shown that the impedance of the network of Figure 1, for instance, is of the form of Equation (3).

The impedance $Z_1$ of the network of Figure 1 is given by the equation:

$$Z_1^2=\frac{\left[\frac{R_1+j\omega L_1}{2}+\frac{j\omega L_1 R_1}{2R_2}\right]\left[2\left(\frac{1}{j\omega C}+R_3\right)+\frac{R_1}{2}+\frac{R_2}{2}\right]}{1+\frac{j\omega L_1}{R_2}}$$

This equation may be rewritten in the following form:

$$Z_1^2=\frac{R_1}{j\omega C}\times\left\{\frac{1+j\omega\left[\frac{L_1(R_1+R_2)}{R_1R_2}+C\frac{(R_1+R_2+4R_3)}{4}\right]}{1+\frac{j\omega L_1}{R_2}}-\frac{\omega^2\left[L_1C(R_1+R_2)\left(\frac{R_1+R_2+4R_3}{4R_1R_2}\right)\right]}{1+\frac{j\omega L_1}{R_2}}\right\}$$

It should be noted that the term representing the length of the cable section does not appear in this expression, since for any reasonable section length, the network impedance is independent of length. This latter equation, it is seen, is in the form:

$$Z=\sqrt{\frac{(1+j\omega M-\omega^2 N)}{1+j\omega P}\times\frac{R_1}{j\omega C}} \quad (5)$$

where $$M=\frac{L_1(R_1+R_2)}{R_1R_2}+C\left[\frac{R_1+R_2+4R_3}{4}\right] \quad (6)$$

$$N=L_1C\frac{R_1+R_2}{R_1R_2}\left[\frac{R_1+R_2+4R_3}{4}\right] \quad (7)$$

$$P=\frac{L_1}{R_2} \quad (8)$$

Equation (5), it is seen, is identical in form with Equation (3) and therefore possesses impedance characteristics simulating those of the cable if M, N and P are made equal to A, B and D respectively. If the notations A, B and D be substituted for M, N and P in the above equations and the four equations solved simultaneously, the value for $L_1$, $R_2$ and $R_3$ will be found to be $$L_1=\frac{-R_1D(CR_1-AD+2A)\pm R_1\sqrt{D^2(CR_1-2A)^2+8BD(CR_1-2D)}}{2(CR_1-2D)} \quad (9)$$

$$R_2=\frac{L_1}{D} \quad (10)$$

$$R_3=\frac{4R_1AD-4R_1D^2-CDR_1^2-(4D+R_1C)L_1}{4R_1CD} \quad (11)$$

This group of three equations, (9), (10) and (11) gives the values of the resistances and inductance to build the network of Figure 1. The values, however, are expressed in terms of A, B, D and C and $R_1$, of which the last two terms can be measured directly from the cable, but the synthetic parameters A, B and D must be determined from Equation (1) which it has been pointed out, represents the impedance of a basic network equivalent to certain properties of the cable. With those five parameters, however, the values of $L_1$, $R_1$, $R_2$, $R_3$ and C, for constructing the network of Figure 1, can be determined. Therefore, it is possible to balance the impedance of a cable with an artificial line constructed of sections of the type of Fig. 1, and a procedure for computing the values has been given.

The networks shown in Figures 2 to 5, can be expressed by equations of similar form to Equation (4) from which the values of M, N and P can be determined in terms of capacity, resistance and inductance and from which the values for the various elements of the networks can be computed.

These equations have not been developed in detail herein but the equations corresponding to Equation (4), of each network are given below with the values of M, N and P derived therefrom.

The network of Figure 2 may be expressed by the following equation:

$$Z_2^2=\frac{R_1}{j\omega C}\left\{\frac{1+j\omega\left[\left(R_5+\frac{R_1}{4}\right)C+L_2\frac{(R_1+R_4)}{R_1R_4}\right]}{1+j\omega\frac{L_2}{R_4}}-\omega^2\frac{\left[\left(R_5+\frac{R_1}{4}\right)\frac{(R_1+R_4)}{R_1R_4}CL_2\right]}{1+j\omega\frac{L_2}{R_4}}\right\}$$

This equation reduces to the form of Equation (5) when:

$$M=\left[\left(R_5+\frac{R_1}{4}\right)C+L_2\frac{(R_1+R_4)}{R_1R_4}\right]$$

$$N=\left[\left(R_5+\frac{R_1}{4}\right)\frac{(R_1+R_4)}{R_1R_4}CL_2\right]$$

$$P=\frac{L_2}{R_4}$$

If small sections are assumed the impedance of the network of Figure 3 may be expressed in the following terms:

$$Z_3^2=\frac{R_1}{j\omega C}\left\{\frac{1+j\omega\left[CR_5+\frac{L_3(R_1+R_4)}{R_1R_4}\right]}{1+j\omega\frac{L_3}{R_4}}-\frac{\omega^2\left[\frac{L_3CR_5(R_1+R_4)}{R_1R_4}\right]}{1+j\omega\frac{L_3}{R_4}}\right\}$$

which equation also reduces to the form of Equation (5) when $$M=\left[CR_5+\frac{L_3(R_1+R_4)}{R_1R_4}\right]$$

$$N=\left[\frac{L_3CR_5(R_1+R_4)}{R_1R_4}\right]$$

$$P=\frac{L_3}{R_4}$$

The impedance of the network of Figure 4 may likewise be expressed in the same form of equation, namely:

$$Z_4^2=\frac{R_6R_7}{R_6+R_7}\left\{\frac{1+j\omega\left[C\left(R_8+\frac{R_7}{4}\right)+\frac{L_3}{R_7}\right]}{1+j\omega\left[\frac{L_3}{R_6+R_7}\right]}-\frac{\omega^2\left[\frac{L_3C}{R_7}\left(R_8+\frac{R_7}{4}\right)\right]}{1+j\omega\left[\frac{L_3}{R_6+R_7}\right]}\right\}$$

which again reduces to the form of Equation (5) when $$R_1=\frac{R_6R_7}{R_6+R_7}$$

$$M=\left[C\left(R_8+\frac{R_7}{4}\right)+\frac{L_3}{R_7}\right]$$

$$N=\left[\frac{L_3C}{R_7}\left(R_8+\frac{R_7}{4}\right)\right]$$

$$P=\frac{L_3}{R_6+R_7}$$

Again, the network of Figure 5 assumes the same general form, namely:

$$Z_5^2=\frac{R_{10}R_9}{R_{10}+R_9}\left\{\frac{1+j\omega\left[C\left(R_3+\frac{R_{10}}{4}\right)+\frac{L_4}{R_9}\right]}{1+j\omega\left[\frac{L_4}{R_{10}+R_9}\right]}-\frac{\omega^2\left[\frac{L_4C}{R_9}\left(R_3+\frac{R_{10}}{4}\right)\right]}{1+j\omega\left[\frac{L_4}{R_{10}+R_9}\right]}\right\}$$

by which the Equation (5) is obtained by making:

$$R_1=\frac{R_{10}R_9}{R_{10}+R_9}$$

$$M=\left[C\left(R_3+\frac{R_{10}}{4}\right)+\frac{L_4}{R_9}\right]$$

$$N=\left[\frac{L_4C}{R_9}\left(R_3+\frac{R_{10}}{4}\right)\right]$$

$$P=\frac{L_4}{R_{10}+R_9}$$

From the equations for $R_1$, M, N and P, the values of resistance and inductance for each network can be determined by substituting the notations A, B and D for M, N and P in the three equations and solving the equations simultaneously, the same as with the network of Figure 1.

Obviously various other arrangements of networks can be devised embodying the principles described herein, which will closely simulate the electrical properties of the cable, and therefore, we do not desire to be limited to the particular forms shown and described but contemplate all equivalent elemental networks as coming within the scope of the appended claims.

What we claim is:

1. An artificial line network adapted to balance a submarine cable over a range of frequencies comprising a plurality of sections, each section including a series resistance element, a resistance element and an inductance element in shunt to each other and in series in the artificial line and a capacity element for balancing the cable capacity, with a resistance in series therewith, the said capacity element and associated resistance being in shunt to the artificial line.

2. A section of artificial line for balancing a predetermined length of submarine cable comprising a parallel network connected serially in the artificial line, said network having resistance in one path and inductance in the other path, a plurality of resistance elements in series with said network and connected symmetrically with respect thereto and a shunt capacity and resistance in series therewith connected to an intermediate point of one of said paths said capacity being of a value to balance substantially the entire capacity of said length of cable.

3. A section of artificial line for balancing a predetermined length of submarine cable comprising a parallel network connected serially in the line and including a resistance path and an inductance path, additional resistance in series with said network and a shunt path including capacity of a value to balance the cable capacity and resistance in series therewith connected to an intermediate point in one of said paths.

4. A section of artificial line for balancing a predetermined length of submarine cable comprising resistance and inductance in series in the artificial line, a resistance in shunt to said inductance and a series capacity and resistance path in shunt to the artificial line said capacity being of a value to balance substantially the entire capacity of said length of cable.

5. A section of artificial line for balancing a predetermined length of submarine cable comprising resistance and inductance in series in the artificial line, additional resistance in shunt to the resistance and inductance, and capacity and resistance in shunt to the artificial line and connected to an intermediate point of said shunting resistance said capacity being of a value to substantially balance the entire capacity of said length of cable.

6. A section of artificial line for balancing a predetermined length of submarine cable comprising resistance and inductance in series in the artificial line, additional resistance in shunt to the inductance, and capacity and resistance in shunt to the artificial line and connected to an intermediate point of said inductance said capacity being of a value to balance substantially the entire capacity of said length of cable.

7. An artificial line section as defined in claim 1 which complies with the following equation:

$$Z=\sqrt{\frac{1+j\omega M-\omega^2N}{1+j\omega P}\times\frac{R}{j\omega C}}$$

8. A section of artificial line for balancing a predetermined length of submarine cable, comprising a series resistance element which balances primarily the resistance of the cable, a resistance element and an inductance element in shunt to each other and also in series in the artificial line, and a capacity in series with a resistance connected in shunt to the artificial line, said latter named elements cooperating with the first to produce an impedance characteristic substantially duplicating that of the cable with respect to resistance, capacity, inductance, and frequency variable resistance and inductance.

9. In an artificial line for balancing a section of submarine cable containing resistance, capacity, inductance, and frequency variable resistance and inductance, a series resistance and a shunt capacity for balancing the fixed resistance and the capacity of the cable respectively, a resistance in series with the capacity and a shunt connected inductance and resistance located in circuit with the series resistance, said latter elements cooperating with the first named elements to balance the frequency variable resistance and inductance of the cable.

10. A section of artificial line for balancing a predetermined length of submarine cable comprising resistance and inductance in series in the artificial line, additional resistance in shunt to said resistance and inductance, and capacity and resistance in shunt to the artificial line, and connected to an intermediate point of said inductance, said capacity being of a value to balance substantially the entire capacity of said length of cable.

WILLIAM D. CANNON.
JOSEPH W. MILNOR.